United States Patent [19]

Huyghe

[11] Patent Number: 4,826,032

[45] Date of Patent: May 2, 1989

[54] BASKET MADE OF METAL WIRE MESH; A PIECE OF WIRE MESH AND A MESH STRIP COMPRISING SUCH WIRE MESH PIECES

[75] Inventor: Wilfried Huyghe, Roeselare, Belgium

[73] Assignee: N.V. Bekaert S.A., Zwevegem, Belgium

[21] Appl. No.: 233,917

[22] Filed: Aug. 18, 1988

Related U.S. Application Data

[63] Continuation of Ser. No. 924,327, Oct. 29, 1986, abandoned.

[30] Foreign Application Priority Data

Nov. 18, 1985 [NL] Netherlands .......................... 8503175

[51] Int. Cl.⁴ ............................................. B65D 90/00
[52] U.S. Cl. ...................................................... 220/19
[58] Field of Search .......................................... 220/19

[56] References Cited

U.S. PATENT DOCUMENTS

| | | |
|---|---|---|
| 1,345,342 | 7/1920 | Beall . |
| 1,569,544 | 1/1926 | Jamison . |
| 1,620,403 | 3/1927 | Southcomb ............................ 220/19 |
| 2,242,111 | 5/1941 | Carsley ................................. 220/19 |
| 3,905,600 | 9/1975 | Bourdamis ........................... 220/19 |
| 3,979,856 | 9/1976 | Belcher ................................ 220/19 |
| 4,250,664 | 2/1981 | Remice ................................ 220/19 |

FOREIGN PATENT DOCUMENTS

| | | |
|---|---|---|
| 430574 | 6/1911 | France . |
| 654412 | 4/1929 | France ................................. 220/19 |
| 094544 | 11/1982 | Japan . |
| 254563 | 7/1926 | United Kingdom . |

Primary Examiner—Joseph Man-Fu Moy
Attorney, Agent, or Firm—Shlesinger & Myers

[57] ABSTRACT

The invention relates to a mesh basket obtained by deforming a metal mesh of which the wires are connected to one another at the intersections, into a permanent shape in a mould, and which, after having received the required shape, is provided with all elements required for its use. The used piece of mesh is characterized in each of the combinations of intersecting wires the spacing between the outermost wires is large than the spacing between the wires located more towards the center (see FIG. 2).

4 Claims, 1 Drawing Sheet

BASKET MADE OF METAL WIRE MESH; A PIECE OF WIRE MESH AND A MESH STRIP COMPRISING SUCH WIRE MESH PIECES

This is a Request for filing a continuation application under 37 CFR 1.62 of prior application Ser. No. 924,327, filed on 10/29/86 entitled, now abandoned.

The invention relates to a mesh basket obtained by deforming a metal wire mesh, of which the wires are connected to one another at the intersections, into a permanent shape in a mould, and which, after having received the required shape, is provided with all other elements required for its use. A similar wire basket is known from the U.S. Pat. No. 1,569,544 and from the British Specification No. 254.563.

Those Patent Specifications describe a wire basket which can be used e.g. for frying food, and which is provided with a handle and a reinforcing edge, and can be slid into a frying pan.

Generally, a similar known wire basket is made of wire mesh of intersecting wires interconnected at the intersections by means of welding, soldering, or other means, e.g. gluing. Such a wire basket is made e.g. starting from a piece of wire mesh of suitable dimensions which is transformed in a mould having the shape of a pan. After obtaining the pan shape, the edge and handle are added in one or more operations and the mesh basket is ready for use.

If, for making a similar mesh basket, e.g. metal mesh having square meshes is used, then the phenomenon as illustrated in the drawings of U.S. Pat. No. 1.569.544 and British Patent Specification No. 254.563 may produce itself. The FIGS. 1 and 2 of the drawing of the U.S. Pat. No. 1.569.544 show that the edges of the mesh basket contain areas in which the holes are smaller than those in the original mesh piece. Such a reduction in size occurs in those place where in the original e.g. square piece of mesh the corners were positioned. When forming the piece of mesh into a pan-shape in a mould, the square holes in the corners of the mesh will be stretched along the diagonal line of those holes, so that the other diagonal line of the holes is shortened and the corresponding corners are brought closer together. The outcome of this operation is that in four spots of the mesh basket there are areas with smaller holes which alternate with areas with normal or larger holes.

The drawback of having smaller holes is that, when such a mesh basket is used e.g. for frying food, residues may accumulate in those reduced holes, which, in the course of time, will carbonize. This is quite undesirable. Such carbonized residues may ruin the taste of any food prepared in the pan. In addition, nowadays, the view is held that such products as benzopyrene, which is formed during the carbonization of organic material, may occur and are extremely hazardous to health.

The present invention aims at providing a mesh which does not offer the abovementioned drawback and which, over the entire surface of the mesh basket, has holes whose surfaces or openings are substantially equal to the open surfaces of the holes in the original piece of mesh.

According to the invention, the mesh basket of the abovementioned type is characterized in that a piece of mesh is used in which, in each of the combinations of intersecting wires, the spacing between the outermost wires is larger than the spacing between the wires located more towards the center.

By taking a larger spacing between the outermost wires than the spacing between the wires located more towards the center for the mesh piece used for making the mesh basket, it can be achieved during deformation of the mesh in a mould, that the square holes originally located in the corners of the original mesh piece, in case of deformation along the diagonal line of these holes, maintain an open surface which approximately corresponds with the open surface of the holes in the center of the original piece of mesh.

With this embodiment it is assumed that, going from the center towards the outer sides in a wire combination, the spacing between the wires in the edge zone of the mesh piece is equal and larger than the equal spacing between the wires in a center zone of the mesh piece. Such a mesh piece will essentially be composed of two parts: a center part with relatively small holes and an edge zone with relatively large holes. The surface proportions of the center zone to the edge zone can be selected in view of the mesh basket to be formed.

More in particular, in the mesh piece to be used for forming a mesh basket according to the invention, the spacing between the wires of the mesh piece in the edge zone will be 10 to 25 mm and the spacing between the wires in the center zone 5 to 15 mm. In a specific embodiment of a mesh basket according to the invention, a piece of mesh is used having square meshes and the spacing between the wires in the edge zone of the mesh piece is 16 mm, and the spacing between the wires in the center zone is 8 mm, while the surface of the center zone will be approximately $\frac{1}{4}$ of the total surface of the entire mesh piece.

The invention also relates to a mesh piece composed of metal mesh, of which the wires are connected to each other at the intersections and which is to be used for making a mesh basket. In each of the combinations of intersecting wires of the mesh piece, the spacing between the outermost wires is larger than the spacing between the wires located more towards the center.

Finally, the invention also relates to a mesh strip which, at least in the lengthwise direction, comprises a number of distinct equal elements. According to the invention, each of the elements is formed by a mesh piece according to the invention as described above. It will be clear that in such a mesh strip, the different equal elements can be included in a row, whereby, between the elements, there is no separation or the elements are connected directly to one another. One can also contemplate the presence of an intermediate area between the elements that together form the mesh strip. This permits the separate elements be cut off in the form of mesh pieces according to the invention. It is also possible to incorporate such elements either in a row following each another, or in a position adjacent to one another in a mesh strip according to the invention. A similar mesh strip can be made in accordance with known methods, whereby the finished strip can be wound up and be shipped in this condition to the users. In their workshop, the latter can cut the mesh strip in the form of mesh pieces according to the invention. Evidently, a cutting device can be installed also directly after the mesh strip manufacturing machine, so that the mesh pieces become available directly after this machine. The mesh to be used for making such mesh baskets may have different embodiments, as described earlier, a mesh with square holes sized 8×8 mm in the center zone and a wire thickness of approximately 0,6 to 0,9 mm, preferably 0,75 mm is very suitable for a frying mesh basket. In that case it is preferable to weld the wires together at the intersections.

The invention will now be clarified with reference to the drawing in which

Figure 1:
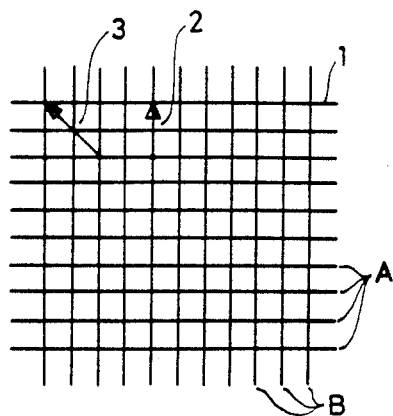
FIG. 1 is a view of a mesh piece for making a mesh basket according to the state of the art.

In FIG. 1, reference number 1 refers to a wire piece for making a mesh basket according to the state of the art. Reference number 2 shows the direction in which the deformation forces act during the formation of a mesh basket in a mould. It illustrates that, during deformation, the mesh size of the mesh will not change or will not enlarge. Reference number 3 shows the direction in which the deformation force acts at the corners of a similar mesh piece. It illustrates that during deformation, the diagonal line of the meshes located in the corner will be enlarged so that the surface of the meshes located there will be diminished. This produces the clogging phenomena already referred, when such a mesh is used for making a basket. The respective wire combinations of the mesh piece are designated with A and B.

Figure 2:
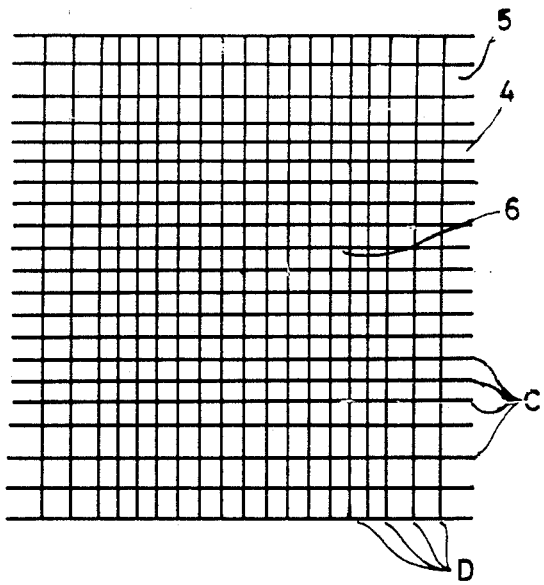
FIG. 2 is a view of a mesh piece for making a mesh basket according to the invention and FIG. 3 is a view of a mesh strip composed of wire pieces according to the invention.

In FIG. 2, reference number 4 refers to a mesh piece according to the invention. Number 5 designates a mesh in the corner area of the mesh piece according to the invention, and the figure shows that this mesh is larger than the surface of the meshes 6 in the center area of the mesh piece according to the invention. The wire combinations of the mesh piece according to the invention are designated C and D. During the deformation of this mesh piece to form a mesh basket, a reduction in surface area of the meshes located in the corner points of the mesh piece will occur. This reduction, in the edge areas of the mesh piece, however, will, with a proper choice of the spacing between the wires, respectively wire combinations, not result in the mesh surfaces in the corner points become smaller than the mesh surface in the center area.

Figure 3:
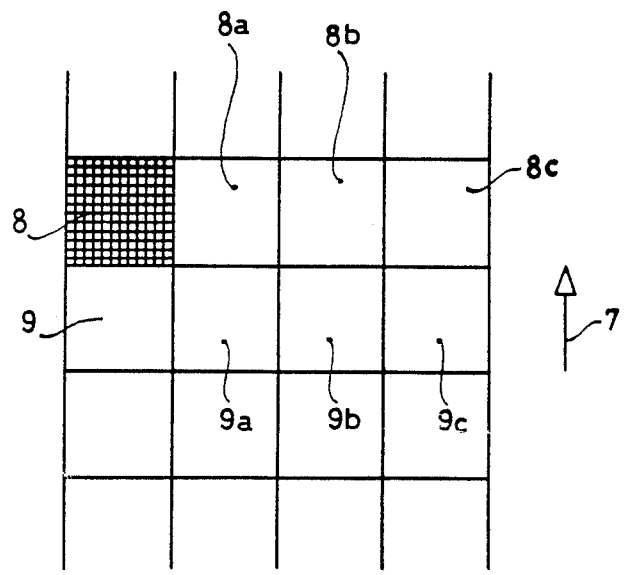

Finally, FIG. 3 is a schematic view of a mesh strip composed of a number of equal mesh pieces 8 according to the invention. In this case, the strip direction is shown by reference number 7. The mesh pieces are all equal to the schematically shown mesh piece 8, and it illustrated, that, in the lengthwise direction of the strip, four mesh pieces are always juxtaposed, respectively 8, 8a, 8b, 8c and 9, 9a, 9b, 9c. Between the elements of the strip of mesh pieces, cutting zones may also be provided to facilitate separation of the mesh pieces from the woven strip, and without a reduction in surface area of the required mesh piece.

I claim:

1. A piece of wire mesh to be formed into a fry basket, comprising:
    (a) a first series of strands running in a first direction and a second series of strands running in a second direction generally transverse to said first direction;
    (b) said first series of strands running generally parallel to each other;
    (c) said second series of strands running generally parallel to each other;
    (d) said piece of wire mesh having a generally central zone and a generally marginal zone;
    (e) said piece of wire mesh having top, bottom, and side edges;
    (f) said edges having central and outer portions;
    (g) said first series of strands running generally parallel to said top and bottom edges;
    (h) said second series of strands running generally parallel to said side edges;
    (i) one of said first and second series of strands being spaced to form openings with the other of said first and second series of strands; and
    (j) the openings formed in said central zone of said piece of wire mesh being smaller than the openings formed in said marginal zone thereof, wherein when the wire mesh piece is molded into a basket, the basket has uniform openings throughout the wire mesh.

2. The mesh piece of claim 1, wherein:
    (a) the spacing between the strands in said marginal zone is about 16 mm and the spacing between the strands in said central zone is about 8 mm, and said central zone is about ¼ of the total surface of the wire mesh piece.

3. The mesh piece of claim 1, wherein:
    (a) said openings are rectangles and the strands in said marginal zone are spaced apart from about 10 to about 25 mm and the strands in said central zone are spaced apart from about 5 to about 15 mm.

4. The mesh piece of claim 1, wherein:
    (a) a plurality of said pieces of wire mesh are interconnected into a strip.

* * * * *